United States Patent
Sukegawa et al.

(10) Patent No.: US 6,466,988 B1
(45) Date of Patent: Oct. 15, 2002

(54) MULTIPROCESSOR SYNCHRONIZATION AND COHERENCY CONTROL SYSTEM

(75) Inventors: Naonobu Sukegawa, Inagi; Kouki Uwano, Hadano; Shigeko Hashimoto, Hadano; Masakazu Fukagawa, Hadano; Eiki Kamada, Isehara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/473,276

(22) Filed: Dec. 28, 1999

(30) Foreign Application Priority Data

Dec. 28, 1998 (JP) .......................... 10-372772

(51) Int. Cl.[7] .............................. G06F 13/00
(52) U.S. Cl. ................... 709/248; 711/141; 712/203
(58) Field of Search .................. 711/141; 712/32, 712/203; 709/227, 228, 229, 230, 237, 223, 231, 232, 233, 248

(56) References Cited

U.S. PATENT DOCUMENTS

| | | | | |
|---|---|---|---|---|
| 5,276,828 A | * | 1/1994 | Dion .......................... | 709/248 |
| 5,604,882 A | * | 2/1997 | Hoover et al. .............. | 711/121 |
| 5,611,070 A | * | 3/1997 | Heidelberger et al. ...... | 711/133 |
| 5,613,153 A | * | 3/1997 | Arimilli et al. ............. | 710/1 |
| 5,848,283 A | * | 12/1998 | Moore et al. ............... | 712/40 |
| 5,875,468 A | * | 2/1999 | Erlichson et al. ........... | 711/143 |
| 5,887,138 A | | 3/1999 | Hagersten et al. .......... | 709/215 |
| 5,958,019 A | | 9/1999 | Hagersten et al. .......... | 709/400 |
| 5,968,135 A | | 10/1999 | Teramoto et al. ........... | 709/400 |
| 5,978,874 A | | 11/1999 | Singhal et al. ............. | 710/107 |
| 6,038,651 A | | 3/2000 | VanHuben et al. .......... | 712/21 |
| 6,263,406 B1 | | 7/2001 | Uwano et al. .............. | 711/141 |

FOREIGN PATENT DOCUMENTS

JP         10187634         7/1998

* cited by examiner

Primary Examiner—B. James Peikari
(74) Attorney, Agent, or Firm—Antonelli, Terry, Stout & Kraus, LLP

(57) ABSTRACT

A shared main memory type multiprocessor is arranged to have a switch connection type. The multiprocessor prepares an instruction for outputting a synchronization transaction. When each CPU executes this instruction, after all the transactions of the preceding instructions are output, the synchronization transaction is output to the main memory and the coherence controller. By the synchronization transaction, the main memory serializes the memory accesses and the coherence controller guarantees the completion of the cache coherence control. This makes it possible to serialize the memory accesses and guarantee the completion of the cache coherence control at the same time.

12 Claims, 9 Drawing Sheets

FROM / TO SYNCHRONIZATION CONTROLLER

MULTIPROCESSOR SYNCHRONIZATION AND COHERENCY CONTROL SYSTEM

CROSS-REFERENCE TO RELATED APPLICATION

This application relates to U.S. patent application Ser. No. 09/153,872 entitled "Parallel Processor Control Method and System" filed on Sep. 16, 1998, now U.S. Pat. No. 6,263,406, by the partially common inventors and assigned to the present assignee, which describes synchronous control of plural processors having a function of guaranteeing cache coherence. The content of that application is incorporated herein by reference.

BACKGROUND OF THE INVENTION

1. Field of the Invention

The present invention relates to a shared main memory type multiprocessor system arranged to have a switch connection, and more particularly to a multiprocessor system which is suitable to sequential control of memory accesses among processors, the sequential control having coherence control of a cache located inside of each processor.

2. Description of the Related Art

In order to improve performance of a computer, a multiprocessor system is widely used which is arranged to use plural processors at a time. The multiprocessor system is divided into a distributed memory type and a shared main memory type. The former is arranged to prepare a main memory for each processor, while the latter is arranged to share a main memory among relevant processors. The latter is more likely to be programmed than the former because the latter serves to manage the data shared among the processors more easily than the former. Hence, the latter is more widely used.

The multiprocessor system is arranged to allow the relevant processors to be operated independently by exchanging data among the processors if necessary while the system is in operation. In exchanging data, the shared main memory type multiprocessor is operated so that one processor may read a value written on a main memory by another processor. This kind of data exchange among the processors needs sequential control of memory accesses among the processors. Concretely, in a case that one processor reads out the data written by another processor, the system needs to guarantee that this read is executed not before but after writing the data.

Herein, the representative arrangement of the shared main memory type multiprocessor will be described with reference to FIGS. 12 and 13. FIG. 12 shows a bus type multiprocessor, in which CPUs 5100 to 5130 are connected through a memory bus 5150 and operate to make access to a main memory 5140 through this memory bus 5150. The accesses may be serialized by the memory bus 5150. This serialization is more likely to control the sequence of writing and reading for exchanging the data. However, disadvantageously, the amount of accessing from the CPUs 5100 to 5130 to the main memory 5140 is limited by the neck of the memory bus 5150.

On the other hand, the switch connection type multiprocessor shown in FIG. 13 is arranged so that the CPUs 5200 to 5230 are individually connected to the main memory 5240. The switch connection type is characterized by low interference in each CPULs access on the main memory. For example, the access of the CPU 5200 onto the main memory 5240 through a line 5250 has no influence on the accessing paths 5260 to 5280 between the other CPUs 5210 and the main memory 5240. In an actual arrangement, a multistage switch is often provided between each of the CPUs 5200 to 5230 and the main memory 5240, in which case substantial interference may take place. However, unlike the bus type, the switch connection type has no element of completely serializing the CPU1s accesses on the main memory. Hence, the interference is negligible. As a result, the switch connection type realizes high accessing performance. On the other hand, this type of multiprocessor is arranged so that the CPUs are operated individually. This makes it difficult to guarantee the memory access sequence among the processors.

JP-A-10-187634 has disclosed a switch connection type shared main memory type multiprocessor system having a function of rapidly controlling memory access sequence among the processors. Concretely, an instruction for synchronization is prepared in the processor, and the memory access is serialized by using the transaction to be output in response to this instruction. This serialization is used for controlling the sequence of writing and reading among the processors.

A cache is widely used as a technique of speeding up the processor. The multiprocessor system having such a cache for each processor must maintain cache coherence (cache coherence control). The cache coherence control is executed for updating the previous data on the cache or purging it if one processor updates the data having the same memory address as the data registered in the cache of another processor. In order to guarantee the reading of correct data in exchanging the data, it is necessary to execute the cache coherence control for the target data.

SUMMARY OF THE INVENTION

It is therefore an object of the present invention to provide a multiprocessor system having an instruction for synchronizing the processors which system is arranged to guarantee cache coherence.

It is a further object of the present invention to provide a multiprocessor system which is arranged to execute memory access sequential control and cache coherence control not independently but together at once, which will make the data swap between the processors more efficient.

The multiprocessor system prepares a synchronize instruction in each relevant processor and serializes the accesses on the main memory and guarantees completion of the coherence control by using a transaction to be output from each processor in response to the instruction. Concretely, the multiprocessor realizes the following four functions.

(1) Each processor operates to output all the transactions of the instructions executed before the synchronize instruction to the main memory and then output the transaction by the synchronize instruction. This transaction is output to both of the main memory and the cache coherence controller.

(2) The main memory provides a mechanism of stopping the access to the main memory done by the source processor when it receives the transaction for synchronization. When the main memory receives the transactions for synchronization from all the processors, the main memory restarts the access to be given from the processors. This function makes it possible to serialize the accesses to the main memory from the processors.

(3) When the cache coherence controller receives the transactions for synchronization from all the processors, the cache coherence controller operates to complete the coherence control about the transactions previous to the transaction for synchronization and notify each processor of the completion of the coherence control.

(4) Between when the transaction for synchronization is received by each processor and when the notice of completion from the cache coherence controller is received by each processor, each processor interrupts the execution of the following instructions. It does not restart these instructions until the notice of completion is received. This function makes it possible to guarantee the completion of the cache coherence control.

DESCRIPTION OF PREFERRED EMBODIMENTS

Figure 1:
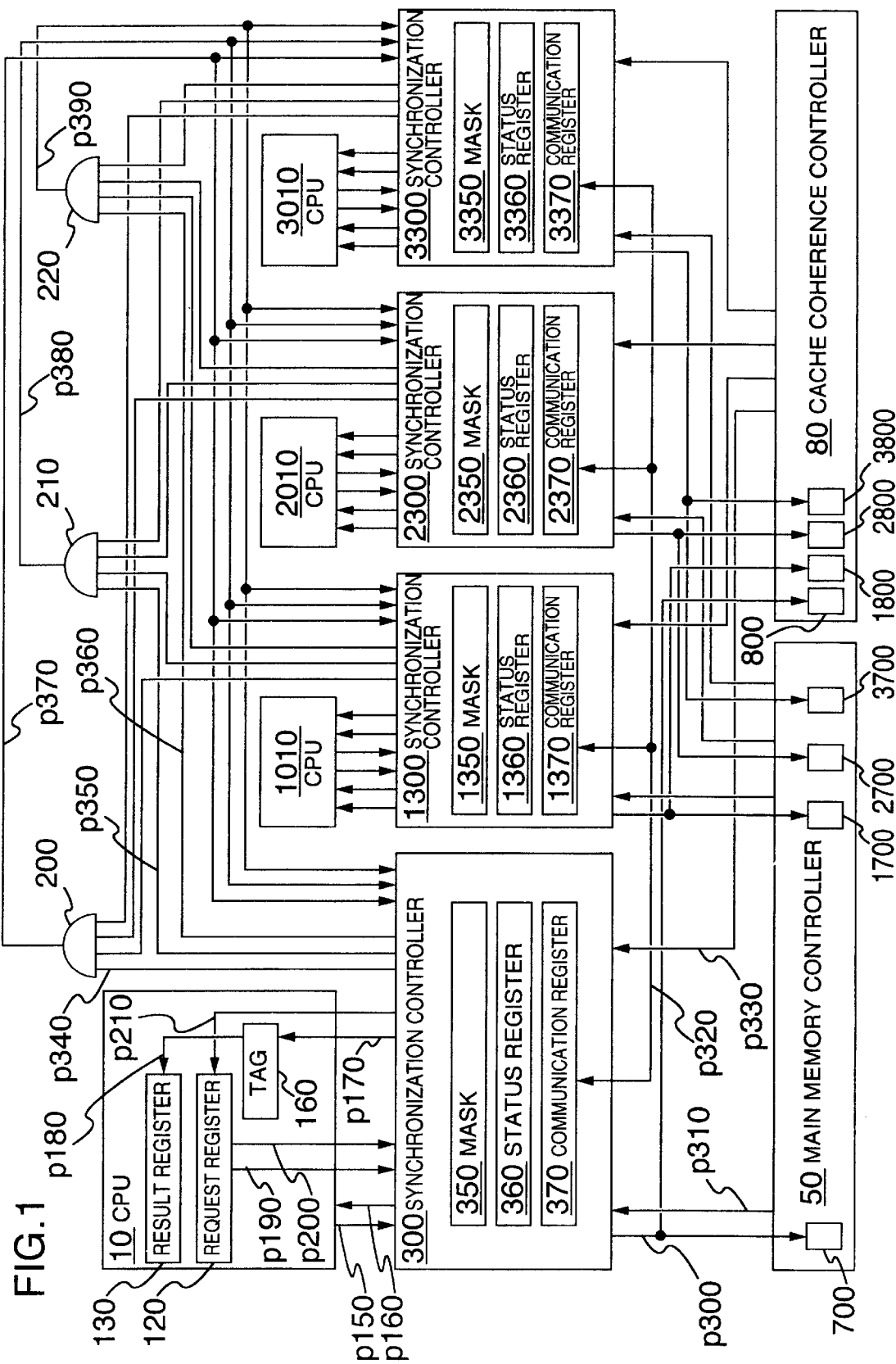
FIG. 1 is a block diagram showing a multiprocessor system provided with a synchronizing mechanism according to an embodiment of the present invention.

Hereafter, an embodiment of the present invention will be described. The description will be oriented to the concept of barrier synchronization corresponding to "the method of guaranteeing memory access sequence accompanied with coherence control" employed in the present embodiment and then the summary and the details of this embodiment.

1. Concept of Barrier Synchronization

In understanding the content of this embodiment, the description will be oriented to the "barrier synchronization" employed by this embodiment as means of executing the cache coherence control and the memory access sequence control at a time.

1.1 Meaning of Barrier Synchronization

In this embodiment, the term "barrier synchronization" is used as the means for meeting the following three items.

In addition, if the cache is effective, the following three items are met. That is, the "load/store" to be described below may be effective in the cache hit or the cache mishit.

(1) Any plural number of processors may take part in the barrier synchronization. Among all the processors taking part therein, the coherence control and the memory access sequence control described in items (2) and (3) are executed. The following items (2) and (3) will be described as a guaranteeing matter between the processors taking part in the barrier synchronization.

(2) The memory access done by each processor before the barrier synchronization is reflected on the memory access to be executed by each processor after the barrier synchronization. In other words, the "store" onto the main memory by any processor before the barrier synchronization' may be reflected on the "load" on the same address by any processor to be executed after the barrier synchronization.

(3) The memory access to be done by each processor after the barrier synchronization does not have any influence on the memory access executed by each processor before the barrier synchronization. In other words, the "store" on the main memory to be executed by any processor after the barrier synchronization is not reflected on the "load" on the same address by any processor executed before the barrier synchronization.

1.2 Method of Use of Barrier Synchronization

The method of use of the barrier synchronization will be described with reference to FIG. 11.

In the case of executing a huge amount of loop operations, often required by the technical calculation, through the use of a multiprocessor system, the content of the loop is divided and each divided part is executed by each corresponding processor. In FIG. 11, a program to be executed in parallel is denoted by 5000 and the executing sequence of this program by four CPUs is denotes by 5010 to 5060. The hatched portion indicates the processing time of this program by each CPU.

The portion except the loop is commonly processed by a single processor, because this portion cannot be so advantageously processed by the multiprocessor. In FIG. 11, all the portion except the loop operations is executed by the CPU 0 (5010 and 5060 in FIG. 11). On the other hand, the loop operations need to do a great deal of processing, so that it is shared by all the CPUs (5020 to 5050 in FIG. 11).

Figure 11:
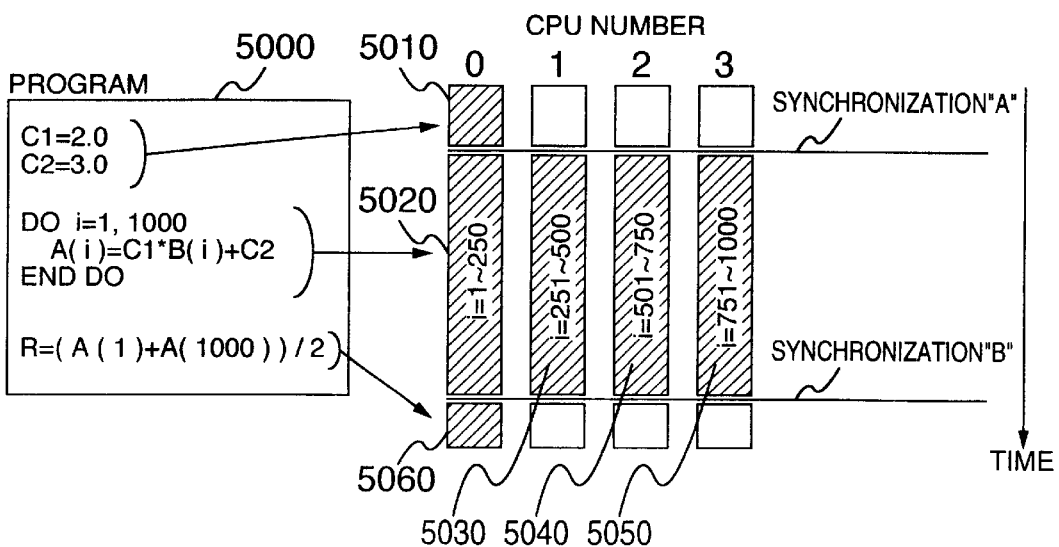
FIG. 11 is a view showing the synchronizing example implemented by the embodiment.
Figure 12:
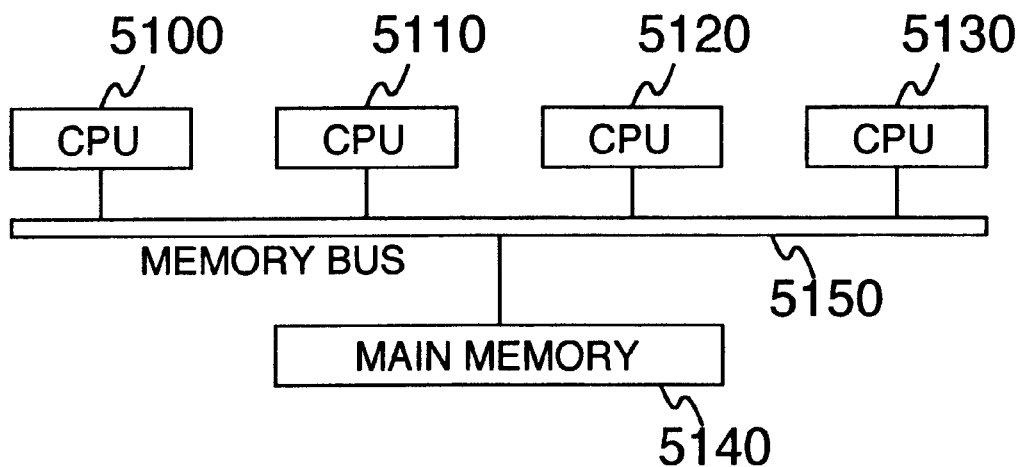
FIG. 12 is a block diagram showing a shared main memory type multiprocessor of a bus connection type.
Figure 13:
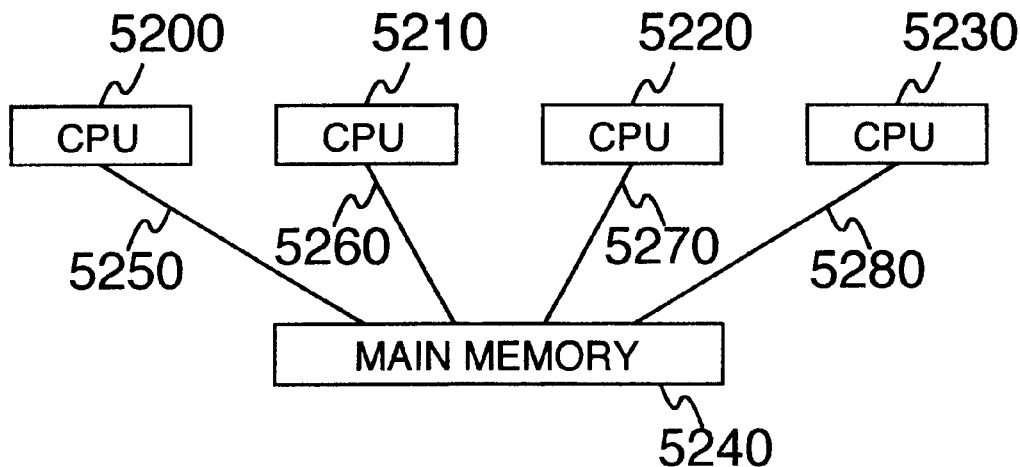
FIG. 13 is a conceptual view showing a shared main memory type multiprocessor of a switch connection type.

In the program as shown in FIG. 11, the result stored in the process 5010 before the loop by the CPU 0 is used in the loop operations 5030 to 5050 by the CPUs 1 to 3. The calculated results of the loop operations 5030 to 5050 by the CPUs 1 to 3 are often used in the process 5060 after the loop operation by the CPU 0. Hence, it is necessary to guarantee the access sequence before and after the loop operation.

By using the barrier synchronization indicated in the previous section at the synchronous points A and B, the correct access sequence can be guaranteed. That is, by using the barrier synchronization at the synchronous point A, it is guaranteed that the CPUs 1 to 3 can correctly load the result stored at process 5010 by the CPU 0. Further, by using the barrier synchronization at the synchronous point B, it is guaranteed that at the process 5060 the CPU 0 can correctly load the result stored at the processes 5030 to 5050 by the CPUs 1 to 3. In this case, both at the synchronous points A and B, the CPUs 0 to 3 are all required to take part in the barrier synchronization.

Hereafter, in this embodiment, the description will be oriented to the method of mounting the barrier synchronization and the operation thereof in the shared main memory multiprocessor system of a switch connection type.

2. Summary of this Embodiment 2.1 Overall Arrangement of this Embodiment

This section roughly describes the arrangement of this embodiment with reference to FIG. 1.

The four CPUs 10, 1010, 2010 and 3010 share the main memory controller 50. These CPUs 10, 1010, 2010 and 3010 are completely same. In FIG. 1, hence, only the inside of the CPU 10 is described. The CPU 10 includes a request register 120 for holding a request for barrier synchronization and a result register 130 for recording the result of the barrier synchronization in it. The address information of the data registered in the inside cache is stored in a tag 160.

Figure 2:
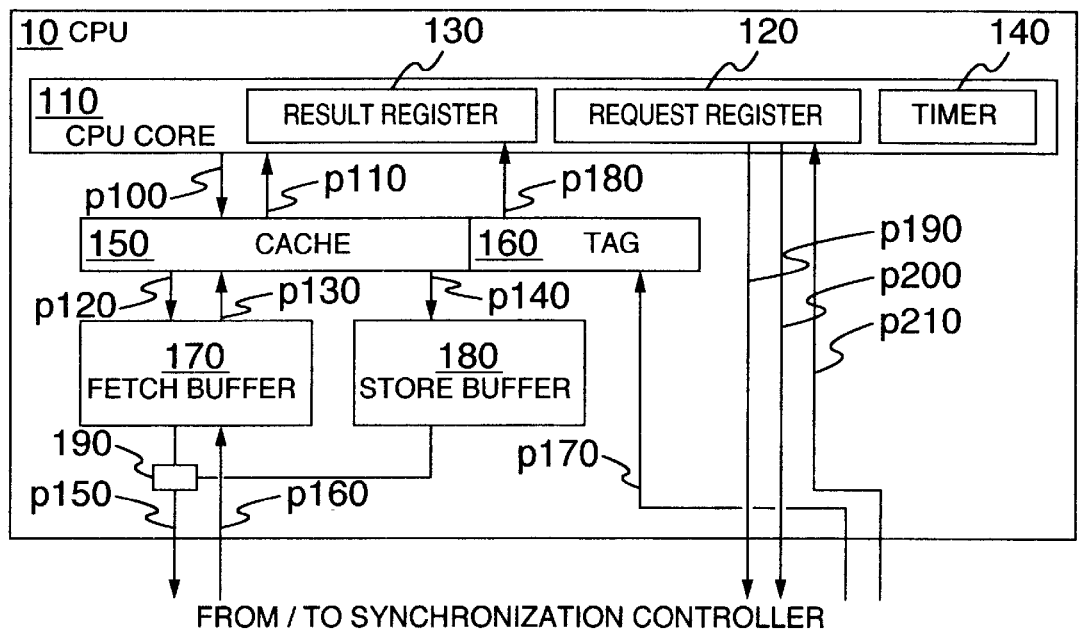
FIG. 2 is a diagram showing a CPU included in the arrangement of the embodiment.

For the cache coherence management to be executed in the shared main memory multiprocessor system shown in FIG. 1, a front address array system (referred to as an FAA system) is used which is executed by a cache coherence controller 80. The FAA system is a system of a copy of tag information (160 in FIG. 2) of each cache of the CPUs 10, 1010, 2010 and 3010 in an FAA (90 in FIG. 10) in the cache coherence controller 80 located outside of the CPU. If a request for updating the main memory is issued from a certain CPU, the cache coherence controller 80 operates to check if the relevant data is registered in the cache of another CPU. If it is registered, the cache coherence controller 80 operates to notify the CPU of invalidity of the relevant data in the cache.

Each CPU prepares a synchronization controller 300, 1300, 2300 and 3300 as a control logic for the barrier synchronization. The synchronization controller performs the following four controls.

(1) Management of synchronization information between the CPUs through the use of AND circuits 200, 210 and 220.

(2) Control of fast data transfer between the 25 CPUs through the use of communication registers 370, 1370, 2370 and 3370.

(3) Control as to whether or not each CPU takes part in the barrier through the use of masks 350, 1350, 2350 and 3350.

(4) Hold of a barrier synchronization state through the use of status registers 360, 1360, 2360 and 3360.

In this embodiment, the synchronization controllers 300, 1300, 2300 and 3300 are provided independently of the CPUs 10, 1010, 2010 and 3010. In place, the synchronization controller may be included inside of each CPU.

The main memory controller 50 is operated in 10 response to the memory access from each of the CPUs 10, 1010, 2010 and 3010. The controller 50 includes barrier detectors 700, 1700, 2700 and 300 inside of itself so that the main memory accesses are serialized by the transaction for the barrier synchronization.

The cache coherence controller 80 maintains the coherence of each cache of the CPUs 10, 1010, 2010 and 3010. In summary, the cache coherence controller 80 performs the processes of holding the tag information of each CPU inside itself, receiving the "store" instruction, checking the tag information of another CPU according to this instruction, if it is detected that it is the "store" of the data registered in the cache, and notify the CPU of the "kill" transaction of purging the registered data. The details of the coherence control will be described below. The cache coherence controller 80 includes the barrier detectors 800, 1800, 2800 and 3800 inside of itself so that the cache coherence control by the barrier synchronization may be serialized.

2.2 Summary of Operation of this Embodiment

This section describes the summary of the operation of this embodiment with reference to FIG. 1. At first, the basic operation/instruction of the CPU is described. Next, the summaries of the memory access method and the normal cache coherence control method are described. Lastly, the summary of the operation of the barrier synchronization is described.

2.2.1 Operation/Instruction of CPU (1) Each of the CPUs 10, 1010, 2010 and 3010 includes a store-through control type cache memory.

(2) Each of the CPUs 10, 1010, 2010 and 3010 includes a normal "load instruction" of loading data from the cache when the cache hit takes place as well as a "dload instruction" (direct load instruction) of necessarily loading data from the main memory (or the communication register to be discussed below) when the cache hit takes place. This dload instruction may be realized in the form of "load onto a cache inhibit page" in some RISC processors.

(3) Each of the CPUs 10, 1010, 2010 and 3010 includes a barrier instruction dedicated for the barrier synchronization. The barrier transaction generated by this barrier instruction is output to the synchronization controllers 300, 1300, 2300 and 3300, the main memory controllers 50, and the cache coherence controllers 80 later than the transactions followed by that of the barrier instruction.

(4) When each of the CPUs 10, 1010, 2010 and 3010 executes the barrier instruction, the CPU stops execution of the subsequent instructions until the barrier synchronization enters into the regulated state.

(5) Each of the CPUs 10, 1010, 2010 and 3010 is not basically required to keep its execution sequence of the instructions coincide with the sequence of the instruction train (out-of-order execution).

As to the item (2), if no dload instruction is given, the optimization is partially made impossible. However, the basic operation of this embodiment is not changed. As to the items (3) and (4), the instructions are not required to be those dedicated for the barrier synchronization. However, as to the barrier transaction, the synchronization controllers 300, 1300, 2300 and 3300, the main memory controller 50, and the coherence controller 80 are required to distinguish it from the other transactions and recognize that it is the "transaction to be synchronized". As to the item (5), the barrier instruction is required to meet the condition of the section 2.2.3 to be discussed below.

2.2.2 Memory Access Method/Normal Coherence Control

The description will be oriented to the memory access method/normal cache coherence control (cache coherence control except the barrier synchronization). Hereafter, the load operation/direct load operation/store operation will be described through the operation of the CPU 10.

(1) Load Operation

When the CPU 10 executes the load instruction, the CPU 10 checks if the data of the target address of the "load" exists in the cache through the tag 160. If the cache is hit, the CPU 10 operates to load the data from the cache. If the mishit takes place in the cache, the load transaction is output to the main memory controller 50 and the cache coherence controller 80 through the line p150, the synchronization controller 300 and the line p300. When the load transaction reaches the main memory controller 50, the main memory controller 50 operates to return the value read from the memory according to the request load address to the CPU 10 through the line p310, the synchronization controller 300, and the line p160. When the data is returned, the CPU 10 operates to store the reply data in the register and use it. At a time, the CPU 10 operates to register the reply data in the cache and the address information of the reply data in the tag 160. When the load instruction is issued for the same data later, the data on the cache may be used.

When the load transaction reaches the cache coherence controller 80, the cache coherence controller 80 operates to put in the FAA that the request load address information is registered in the cache of the CPU 10.

(2) Direct Load Operation

When the CPU 10 executes the direct load instruction, the CPU 10 operates to output the direct load transaction to the main memory controller 50 and the coherence controller 80 through the line p150, the synchronization controller 300 and the line p300 without checking the tag 160.

When the direct load transaction reaches the main memory controller 50, the main memory controller 50 operates to return the value read out of the memory according the request load address into the CPU 10 through the line p330, the synchronization controller 300 and the line p160. When the data is returned, the CPU 10 operates to store the reply data in the register and use it. But, the CPU 10 does not register the reply data in the cache.

When the direct load transaction reaches the cache coherence controller 80, the controller 80 ignores this transaction and does not register it in the FAA. Of course, the direct load transaction itself may be purged before it reaches the cache coherence controller 80.

(3) Store Operation

When the CPU 10 executes the store instruction, the CPU 10 operates to check if the data of the target address of the store instruction exists in the cache through the tag 160 and, if the cache hit takes place, update the cache value. Irrespective of the hit/miss of the cache, the store transaction (including the "store" data) is output to the main memory controller 50 and the cache coherence controller 80 through the line p150, the synchronization controller 300 and the line p300.

When the store transaction reaches the main memory controller 50, the main memory controller 50 operates to update the "store" data about the target address.

When the store transaction reaches the cache coherence controller 80, the cache coherence controller 80 operates to check the FAA as to whether or not the data of the target address of the "store" is registered in the cache of the CPU 1010, 2010 or 3010 except the store requester CPU 10. If the data is registered in any of the CPUs, the "kill" transaction of the relevant data is output to the CPU. By changing the operation pattern between the CPUs, as to the case the kill transaction is output to the CPU 10 by the "store" from the CPU 1010", the operation of the kill transaction will be described. The "kill" transaction reaches the tag 160 through the line p330, the synchronization controller 300 and the line p170. In the tag 160, if the data indicated in the "kill" transaction stays on the cache, this transaction is purged.

When the data is registered on each cache of the CPUs 10, 1010, 2010 and 3010, the foregoing coherence control is executed so that the data on the cache may be registered in the cache coherence controller 80. When one CPU issues the "store" instruction to the data registered in the cache of another CPU, the data registered in the cache is purged from the cache. Hence, though one CPU stores the data, the data before the "store" is not still left in the cache of another processor. It means that the basic cache coherence control can be achieved. However, apparently, a time lag takes place between when the "store" operation gives an influence onto the main memory controller 50 and when the data is purged from the tag of each CPU by the "kill" transaction.

2.2.3 Summary of Operation of Barrier Synchronization

In turn, the description will be oriented to the basic operation of the barrier synchronization. As mentioned above, the barrier synchronization has to keep two points of "the influence of the memory access before the barrier synchronization is completely reflected on the memory access after the barrier synchronization." and "the memory access after the barrier synchronization does not give any influence onto the memory access before the barrier synchronization." Herein, the memory access includes the case wherein no transaction to the main memory controller 50 takes place even if the cache is hit. To realize this, the hardware shown in FIG. 1 basically performs the following operation in the barrier synchronization.

(A) With regard to the memory access instructions before the barrier instruction, each of the CPUs 10, 1010, 2010 and 3010 operate to output the barrier transaction until the following three conditions are met.

(A-1) With regard to all the load instructions before the barrier instruction, if the cache hit takes place thereabout, the read from the cache is completed or, if the cache miss takes place thereabout, at least a load request transaction is output by the CPUs 10, 1010, 2010 and 3010.

(A-2) With regard to all the dload instructions before the barrier instruction, at least a dload request transaction is output by the CPUs 10, 1010, 2010 and 3010.

(A-3) With regard to all the store instructions before the barrier instruction, at least a store request transaction is output by the CPUs 10, 1010, 2010, 2010 and 3010.

(B) The main memory controller 50 operates to detect the barrier transaction through the effect of the barrier detectors 700, 1700, 2700 and 3700 inside thereof. If it is detected, the request from the path (for example, when the barrier detector 700 detects the transaction, the request through the line p300) is stopped. When all the barrier detectors 700, 1700, 2700 and 3700 detect the transaction, the operation of stopping the request is completed and then the access to the main memory is restarted. (C) The cache coherence controller 80 operates to detect the barrier transaction through the effect of the barrier detectors 800, 1800, 2800 and 3800 located inside thereof. When all the barrier detectors 800, 1800, 2800 and 3800 detect the barrier, the cache coherence controller 80 operates to generate an acknowledge transaction at the tail of a kill transaction resulting from all the requests reaching the cache coherence controller 80 before the last barrier transaction. Then, the cache coherence controller 80 operates to send out the acknowledge transaction to the CPUs 10, 1010, 2010 and 3010 through the synchronization controllers 300, 1300, 2300 and 3300.

(D) Each of the CPUs 10, 1010, 2010 and 3010 is in the waiting state at the barrier instruction until the acknowledge transaction from the coherence controller 80 reaches the CPU and the overall process of the kill transaction followed by the acknowledge transaction is completed. Each CPU does not execute the instruction after the barrier instruction until the barrier instruction is not finished.

The foregoing (A) to (D) make it possible to' guarantee the following matters.

(1) The transaction to the main memory controller 50 resulting from any instruction before the barrier instruction reaches the main memory controller, 50 before the barrier transaction on the basis of the condition (A). The transaction to the main memory controller 50 resulting from any instruction following the barrier instruction is output by the CPU after the barrier is established on the basis of the condition (D). At a time when the barrier is established, it is guaranteed that the barrier transaction from all the CPUs is output on the basis of the condition (C). Hence, the transaction resulting from any instruction after the barrier instruction does not reach the main memory controller 50 before the barrier transaction. In some arrangements, at a time when the barrier is established, it is not guaranteed that all the barrier transactions come even in the main memory controller 50. This is because the establishment of the barrier merely means all the barrier transactions come in the coherence controller 80. If the main memory controller 50 is in a busy state, all the barrier transactions do not come in the main memory controller 50. In action, however, it is guaranteed that the barrier transaction has been already output to the main memory controller 50. With regard to the transaction to the main memory controller 50, the control (B) makes it possible to reflect the transaction to the main memory controller 50 resulting from any instruction executed before the barrier instruction by any CPU onto the transaction to the main memory controller 50 resulting from any instruction to be executed after the barrier instruction by any CPU. Conversely, the transaction to the main memory controller 50 resulting from any instruction executed before the barrier instruction by any CPU is not influenced by the transaction to the main memory controller 50 resulting from the instruction to be executed after the barrier instruction by any CPU.

(2) The store transaction to be done by the store instruction existing before the barrier instruction reaches the coherence controller 80 before the barrier transaction on the basis of the condition (A). The condition (C) makes it possible to receive the kill transaction resulting from the store instruction before the barrier instruction of each of all the CPUs before each CPU receives acknowledge of the barrier. The condition (D) makes it possible to process the kill transaction received by the coherence controller 80 at a time when the instruction after the barrier instruction is started. That is, after the completion of the cache coherence control by the store instruction located before the barrier instruction, each CPU starts execution of the instruction following the barrier instruction.

From the processes (1) and (2), the result of the store instruction executed before the barrier instruction by any CPU may be referred by any CPU through the load instruction (including both the cache hit/miss hit) and the dload instruction to be executed after the barrier instruction. The store instruction to be executed after the barrier instruction by any CPU is not influenced by the load/dload before the barrier instruction executed by any CPU. Hence, the conditions (2) and (3) of the section 1.1 described about the definition of the barrier synchronization are met.

3. Details of the Present Embodiment

Hereafter, the description will be oriented to the details of the present embodiment, concretely, the operation of each component of this embodiment with reference to FIGS. 1 to 10. Lastly, the description will be oriented to the instruction sequence containing the functions of this embodiment with reference to FIGS. 14 to 16.

3.1 CPU

The CPUs 10, 1010, 2010 and 3010 shown in FIG. 1 have the same arrangement as one another. This section describes the inside arrangement and the operation of the CPU 10 with reference to FIG. 2.

The CPU 10 includes a cache 150, a tag 160 for storing address information of the data to be registered in the cache, a fetch buffer 170 served as a buffer for the load/dload transaction to the main memory controller 50, and a store buffer 180 served as a buffer for the store transaction. Further, a CPU core 110 includes a request register 120 for holding a request state of the barrier, a result register 130 for holding the result of the barrier, and a timer 140 for monitoring a waiting time in the barrier instruction.

Hereafter, at first, the description will be oriented to the operation of the CPU 10 in the load/dload/store instruction.

When the load instruction is executed by the CPU core 110, the load request is output to the cache through the line p100. The cache 150 operates to compare the address of the load request with the address registered in the tag 160. If the cache hit takes place, the result is given back to the CPU core 110 through the line p110. If the cache miss takes place, the load request is stored in the fetch buffer 170 through the line p120. Unlike the load instruction, if the cache hit takes place, the dload instruction is executed to store the dload request in the fetch buffer 170 through the line p120. When the store instruction is executed by the CPU core 110, the store request is output to the cache through the line 100. The cache 150 operates to compare the address of the store request with the address registered in the tag 160 and, if the cache hit takes place, update the data on the cache. Whether or not the cache hit or cache mishit may take place, the store transaction is stored in the store buffer 180 through the line p140. Further, the CPU 10 is operated on the out-of-order execution. Hence, the sequence in the instruction sequence is not necessarily same as the storing sequence in the fetch buffer 170 and the store buffer 180. However, the fetch buffer 170 and the store buffer 180 perform the FIFO control.

A priority circuit 190 operates to output the transaction stored in the fetch buffer 170 and the store buffer 180 to the synchronization controller 300 through the line p150. The priority may be arbitrarily given to the fetch buffer 170 and' the store buffer 180. In the case of the load/dload request, at last, the reply data is given back through the line p160. This data is stored in the cache 150 through the fetch buffer 170 and the line p130 and the relevant address information is stored in the tag 160.

Next, the description will be oriented to the kill transaction for the coherence control.

The kill transaction is passed from the synchronization controller 300 to the tag 160 through the line p170. If any entry hits the address of the kill transaction, the tag 170 operates to purge it.

Next, the description will be oriented to the operation to be done if the barrier instruction is executed.

Figure 3:
FIG. 3 is a view showing a request register included in the arrangement of the embodiment.

When the CPU core 110 executes the barrier instruction, at first, the request register 120 is set. The arrangement of the request register 120 is shown in FIG. 3. The request register 120 has two bits, that is, a R bit 122 and a C bit 124. Herein, the R bit indicates the barrier request and the C bit indicates the presence (C=0)/the absence (C=1) of a wait for completion of the coherence control. If the literal specified by the barrier instruction is 0, R=1 and C=0 are set. If the literal specified by the barrier instruction is 1, R=1 and C=1 are set. The presence/absence of a wait for the coherence control and the literal of the barrier instruction will be described below. The value set to the request register is reset when the start of the barrier is notified through the line p210. In addition, the value of the R bit is passed through the line p190 and the value of the C bit is passed through the line p200, to the synchronization controller 300.

The CPU core 110 operates to output the barrier transaction done by the barrier instruction to the line p100 after all the load/dload/store instructions followed by the barrier instruction. When it is guaranteed that the reply to the load request as a result of the cache hit included in the load request followed by the barrier output from the CPU core 110 to the cache 150 is given back to the CPU core 110 through the line p180 and when it is also guaranteed that all the transactions done by the load/dload/store request followed by the barrier put by the CPU core 110 into the cache 150 are loaded into the fetch buffer 170 and the store buffer 180, the cache 150 operates to load the barrier transaction in the fetch buffer 170 and the store buffer 180.

When the priority circuit 190 is inputted with the barrier transaction from the fetch buffer 170 and the store buffer 180, the priority circuit 190 is served to output the barrier transaction to the synchronization controller 300.

Figure 4:
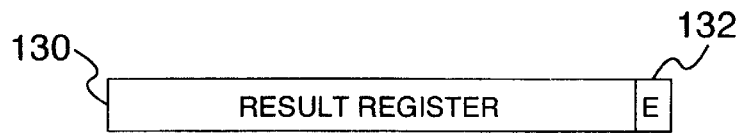
FIG. 4 is a view showing a result register included in the arrangement of the embodiment.
Figure 5:
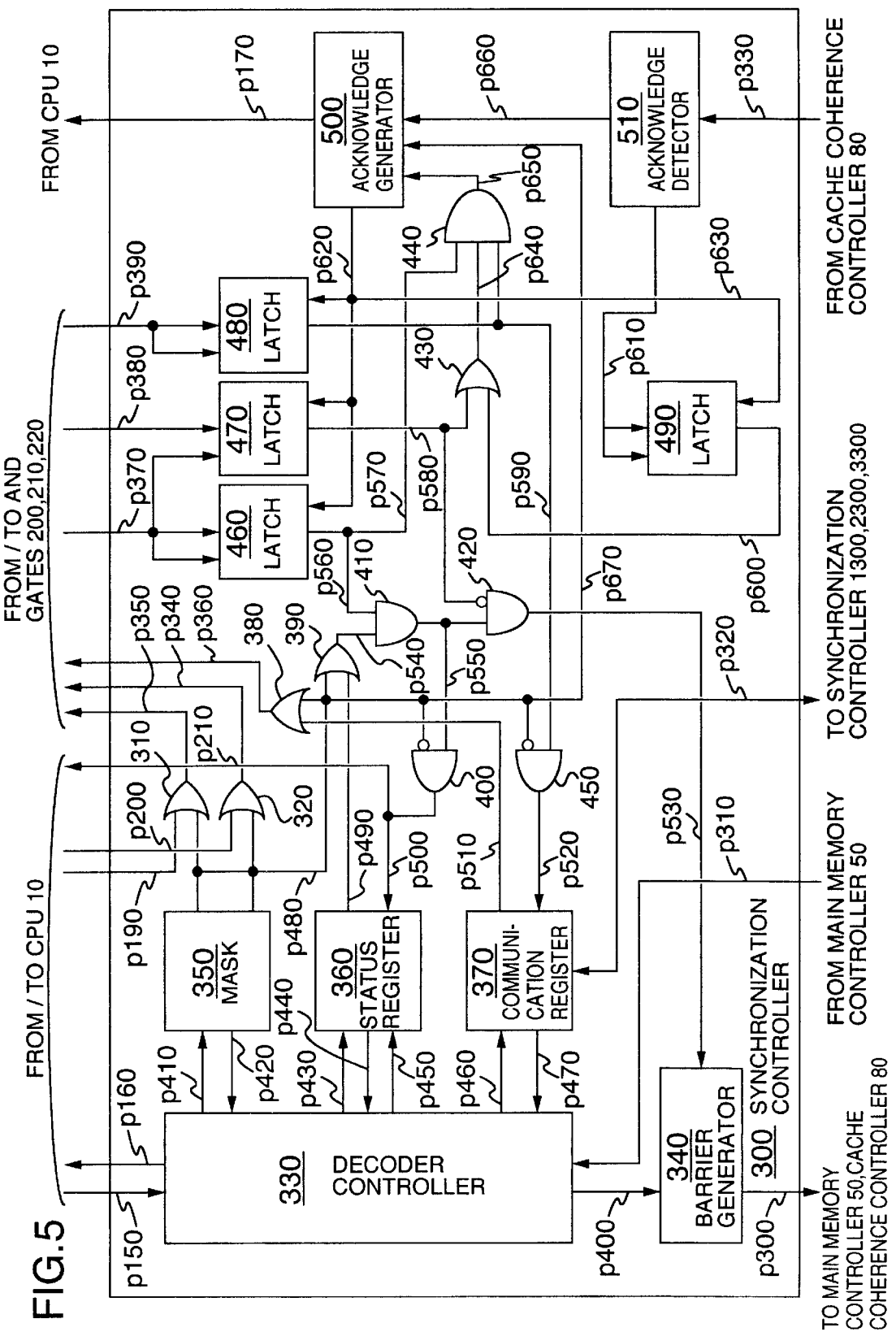
FIG. 5 is a view showing a synchronization controller included in the arrangement of the embodiment.

When the barrier instruction is further executed, the CPU core 110 stops the execution of the succeeding instructions until the completion of the barrier is recorded in the result register 130. The arrangement of the result register is shown in FIG. 4. The result register waits for one bit of the E bit 132. When the acknowledge of the barrier is passed to the tag 160 through the line p170, the synchronization controller 300 operates to pass the acknowledge of the barrier to the result register through the line p180 after it is reflected onto the tag 160 of the preceding kill transaction. This causes the E bit to be set. This E bit is reset when the CPU core finishes the operation of waiting for the acknowledge in the barrier instruction.

The time when the CPU core is waiting in the barrier instruction is monitored by the time. If the waiting time is longer than a regulated time, the CPU core stops the waiting operation in the barrier instruction and then enters into the exceptional operation. In this case, however, the output of the barrier transaction and the setting of the request register are executed on a routine basis. Only the waiting operation is stopped. For example, in some cases, though the CPU 10 enters into the waiting state after the barrier instruction is executed, another CPU 1010 may not reach the barrier instruction because of its program bug. Hence, it is necessary to provide the function of stopping the wait for completion of the barrier synchronization by using the timer. Also in order to kill the process when the time-out takes place, it is necessary to do the save and restore for context switching of the request register 120 and the result register 130.

3.2 Synchronization Controller

Figure 6:
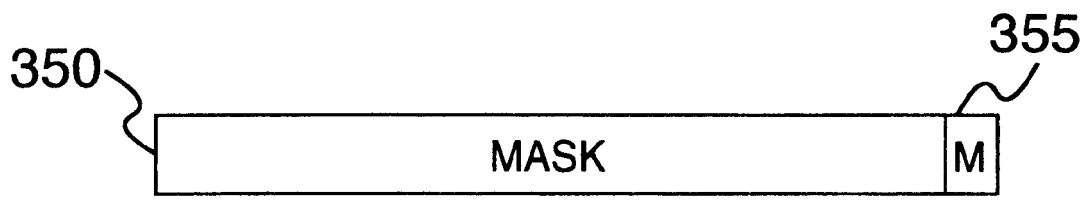
FIG. 6 is a view showing a mask included in the arrangement of the embodiment.

The synchronization controllers 300, 1300, 2300 and 3300 shown in FIG. 1 have the same arrangement as one another. This section roughly describes the arrangement and the operation of the synchronization controller 300 with reference to FIG. 5. The synchronization controller 300 includes a mask 350, a status register 360 and a communication register 370 as its main components. The mask 350 is a register composed of an M bit 355 as shown in FIG. 6. It represents if the CPU 10 connected with the synchronization controller 300 takes part in the barrier synchronization.

Figure 7:
FIG. 7 is a view showing a status register included in the arrangement of the embodiment.

The status register 360 is a register composed of a B bit 365 as shown in FIG. 7. The B bit 365 is set as B=1 when the barrier transaction comes from the CPU 10 to the status register 360 connected thereto. When the synchronization controller 300 outputs the barrier transaction to the main memory controller 50 and the coherence controller 80, the B bit 365 is reset as B=0. Further, the barrier synchronization is taken to have no wait for completion of the coherence control. That is, also when the necessity of outputting the barrier transaction is eliminated, as will be discussed below, the B bit 365 is reset as B=0.

Then, the meaning of the status register 360 will be described. If the CPU 10 executes the barrier instruction and the main memory controller 50 outputs the barrier transaction only when this barrier transaction comes to the synchronization controller 300, the barrier detector 700 of the main memory controller 50 operates to stop the succeeding request. Hence, when the CPU 10 detects the barrier time-out after that, no access can reach the main memory. In order to prevent this, as will be discussed below, of the CPUs 10, 1010, 2010 and 3010, any CPU with no mask executes the barrier instruction and the synchronization controller 300 stores the barrier transaction in the status register 360 without outputting the barrier transaction until it is guaranteed that all the barrier transactions come in the main memory controller 50. Moreover, in order to do a work of killing the process when the CPU 10 detects a time-out, it is essential to save and restore the content of the status register 360.

Figure 8:
FIG. 8 is a communication register included in the arrangement of the embodiment.

The communication register 370 is a memory mapped register prepared for doing rapid data transfer between the CPUs through the main memory. It is a full-bit register as shown in FIG. 8. As shown in FIG. 1, the communication registers 370, 1370, 2370 and 3370 are connected through a bus of a line p320 and are all mirrored. That is, for example, if the CPU 10 sets a certain value to the communication register 370, the value is rapidly conveyed to the communication registers 1370, 2370 and 3370.

The mask 350, the status register 360 and the communication register 370 are all memory mapped registers. Their coherence control cannot be executed by the coherence controller 80. For reading the data from these registers, it is necessary to use not the load instruction but the dload instruction. (In setting the register for the purpose, the store instruction may be used.)

The description will be oriented to the operation of the synchronization controller 300 when the load/dload/ store transactions from the CPU 10 reaches the register. When the synchronization controller 300 receives these transactions through the line p150, these transactions are output to the main memory controller 50 and the cache coherence controller 80 through a decoder controller 330, the line p400, the barrier generator 340 and the line p300. The reply data from the main memory controller 50 is returned to the CPU 10 through the line p310, the decoder controller 330 and the line p160.

The decoder controller 300 does not function for the load/dload/store given to the main memory. If the access to the mask 350, the status register 360 and the communication register 370 is determined from the address of the dload/ store transaction, the decoder controller 330 operates to access each register through the lines p410, p403 and p460. If the dload transaction is given, the reply values are collected through the lines p420, p440 and p470 and then given back to the CPU 10 through the line p160.

If the kill transaction is issued from the coherence controller 80 to the CPU 10 by the load/dload/ store transactions, the kill transaction is passed up to the CPU 10 through the line p330, the acknowledge detector 510, the line p660, the acknowledge generator 500 and the line p170.

In turn, the description will be oriented to the operation of the synchronization controller 300 in the barrier instruction. In response to the barrier instruction, a certain value is set to the request register 120 located inside of the CPU 10. The set value of the request register is passed to the synchronization controller through the lines p190 and p200. The information given through the lines p190 and p200 is output to AND circuits 200 and 210 through the lines p340 and p350. If the CPU 10 is masked, the output to the AND circuits 200 and 210 is constantly set to 1 by the OR circuits 310 and 320 inside of the synchronization controller 300.

When the CPU 10 outputs the barrier transaction to the synchronization controller 300 through the line p150, the decoder controller 330 identifies the barrier transaction and sets the status register 360. Further, the barrier transaction is passed to the communication register 370 through the line p460. The communication register 370 operates to reflect the store transaction earlier than the barrier transaction on itself and terminate its operation. Then, when it is guaranteed that the transaction is conveyed to the communication registers 1370, 2370 and 3370 through the line p320, the line p510 inside of the synchronization controller operates to set the line p510 inside thereof to 1. This signal is output to the AND circuit 220 through the line p360. This signal is constantly set to 1 by the OR circuit 380 inside of the synchronization controller 300 if the CPU 10 is masked.

All the outputs from the synchronization controllers 300, 1300, 2300 and 3300 are set to 1 through the effect of the AND circuits 200, 210 and 220. The result is conveyed to the latches 460, 4.70 and 480 located inside of the synchronization controller 300 through the lines p370, p380 and p390.

The foregoing arrangement makes it possible to set the line p370 to 1 when the request register 120 of any unmasked CPU sets the R bit to 1. The latch 460 is set to 1 when the line p370 is set to 1. When the latch 460 is set, each of the synchronization controllers 300, 1300, 2300 and 3300 is required to output the barrier transaction to the main memory controller 50. Hence, the barrier transaction may be output to the main memory controller 50.

When the C bit of the request register 120 of every unmasked CPU is set to 1, the line p380 is set to 1. The latch 470 is triggered to store the information of the line p380 when the line p370 is set to 1. This means that all the unmasked CPUs specify 1 as a literal of the barrier instruction. If even one CPU specifies 0, the latch 470 stores a value of 0.

When the communication registers of all the unmasked synchronization controllers put one to the line p390, the line p390 is set to 1. It means that the reflect of the store transaction before the barrier instruction on all the communication registers 370, 1370, 2370 and 3370 is terminated.

By setting one to the latch 460, the synchronization controller 300 brings about the barrier synchronization. Hereafter, the description will be oriented to the four patterns of (1) the case that the latch 460 is set to 1 and the latch 470 is set to 0 in the unmasked synchronization controller 300 (with waiting for the completion of the cache coherence control), (2) the case that the latch 460 is set to 1 and the latch 470 is set to 1 in the unmasked synchronization controller 300 (without waiting for the completion of the cache coherence control), (3) the case that the latch 460 is set to 1 and the latch 470 is set to 0 in the masked synchronization controller 300 (with waiting for completion of the cache coherence control), and (4) the latch 460 is set to 1 and the latch 470 is set to 1 in the masked synchronization controller 300 (without waiting for completion of the cache coherence control).

(1) The case that the latch 460 is set to I and the latch 470 is set to 0 in the unmasked synchronization controller 300 (with waiting for completion of the cache coherence control)

Since the latch 460 is set to 1, the line p560 is set to 1. Since the barrier transaction is set to the status register 360, the output line 540 of the OR circuit 390 is set to 1, thereby allowing the line 5S0 to be set to 1. At this time, since the output line p580 of the latch 470 is set to 0, the output of the AND circuit 420 is set to 1. Hence, the barrier generator 340 is started through the line p530. Once the barrier generator 340 is started, the barrier generator 340 operates to generate the barrier transaction and then output the barrier transaction to the main memory controller 50 and the cache coherence controller 80 through the line p300. Further, since the output of the AND circuit 400 is set to 1, the status register 360 is reset through the line p500 and the request register 120 of the CPU 10 is also reset through the line p210.

The foregoing operation may be described as follows. When all the unmasked CPUs execute the barrier instruction and thereby the barrier operation is started, if the presence of the wait for completion of the cache coherence control is specified (at least one CPU specifies zero as the literal of the barrier instruction), the unmasked synchronization controller 300 operates to temporarily store the barrier transaction from the CPU 10 in the status register and then make sure of it. Then, the synchronization controller 300 operates to output the barrier transaction to the main memory controller 50 and the coherence controller 80. At a time, the status register 360 is cleared and the request register of the CPU 10 is cleared as well.

According to the barrier transaction output from the barrier generator 340, the cache coherence controller 80 operates to output the necessary kill transaction to the line p330 and then output the acknowledge transaction to the acknowledge detector 510. When the acknowledge detector 510 detects the acknowledge transaction, the detector 510 sets the latch 490 through the use of the line p610. By this operation, the line p600 is set to 1 and the line p640 is set to 1 by the OR circuit 430. Herein, since the latch 460 has been set to 1, the line p570 is set to 1. Hence, by setting the latch 480 to 1, the line p650 is set to 1. When the acknowledge generator 500 generates the acknowledge transaction when the line p650 is set to 1 and then outputs the acknowledge transaction to the CPU 10 through the line p170. This operation may be described as follows. When the acknowledge transaction is received from the cache coherence controller 80, if the communication register has been already updated, the acknowledge generator 500 operates to output the acknowledge transaction to the CPU 10. After the acknowledge generator 500 outputs the acknowledge transaction to the CPU 10, the acknowledge generator 500 operates to reset the latches 460 and 470 through the line p620.

(2) The case that the latch 460 is set to 1 and the latch 470 is set to 1 in the unmasked synchronization controller 300 (without waiting for completion of the cache coherence control)

Since the latch 460 remains set to 1, the line p560 is set to 1 and since the barrier transaction is set to the status register 360, the output line 540 of the OR circuit 390 is set to 1, thereby allowing the line 550 to be set to 1. At this time, since the output line p580 of the latch 470 is set to 1, the AND circuit 420 keeps zero output. Hence, the barrier generator 340 is not started. Since the output of the AND circuit 400 is one, the status register 360 is reset through the line p500 and the request register 120 of the CPU 10 is reset through the line p210.

The foregoing operation may be described as follows. When all the unmasked CPUs execute the barrier instruction and thereby the barrier operation is started, if no wait for completing the cache coherence control is specified (all the CPUs have specified the literal of the barrier instruction as one), the unmasked synchronization controller 300 operates to temporarily store the barrier transaction from the CPU 10 in the status register and makes sure of it. Then, the synchronization controller 300 operates to erase the transaction without outputting it to the main memory controller 50 and the cache coherence controller 80. The status register 360 and the request register of the CPU 10 are both cleared like the case of no wait for completing the cache coherence control.

Since no acknowledge transaction is sent from the cache coherence controller 80, the latch 490 is not set to 1. However, since the latches 460 and 470 are being set to 1, the OR circuit 430 operates to output 1. Hence, the latch 480 is set to 1, thereby allowing the line p$^6$50 to be set to 1. The acknowledge generator 500 operates to generate the acknowledge transaction when the line p650 is set to 1 and then output the acknowledge transaction to the CPU 10 through the line p170. This means that without receiving the acknowledge transaction from the cache coherence controller 80, the acknowledge generator 500 operates to output the acknowledge transaction to the CPU 10 if the communication register has been already updated. If the acknowledge generator 500 outputs the acknowledge transaction to the CPU 10, the latches 460, 470 and 480 are reset by the line p620.

To perform the foregoing operation, no wait for completing the cache coherence control may be utilized for rapidly guaranteeing the value of the communication register 370. The example will be discussed later.

(3) The case that the latch 460 is set to 1 and the latch 470 is set to 0 in the masked synchronization controller 300 (with waiting for completing the cache coherence control)

If masked, without setting the barrier transaction to the status register 360, the OR circuit 390 operates to output 1. Hence, merely by setting the latch 460 (since the output line p580 of the latch 470 is zero), the barrier generator 340 is started through the line p530. Once the barrier generator 340 is started, the barrier generator 340 operates to generate the barrier transaction and then output the barrier transaction to the main memory controller 50 and the cache coherence controller 80 through the line p300. However, since the output of the AND circuit 400 is not 1, the status register 360 and the request register 120 of the CPU 10 are not reset.

The foregoing operation may be described as follows. When all unmasked CPUs execute the barrier instruction and thereby the barrier operation is started, if the wait for completing the cache coherence control is specified (at least one CPU specifies 0 as the literal of the barrier instruction), the masked synchronization controller 300 operates to unconditionally output the barrier transaction to the main memory controller 50 and the cache coherence controller 80.

According to the barrier transaction output from the barrier generator 340, the cache coherence controller 80 outputs the necessary kill transaction to the line p330 and then the acknowledge transaction up to the acknowledge detector 510. If the acknowledge detector 510 detects the acknowledge transaction, the acknowledge detector 510 operates to set the latch 490 through the use of the line p610. This makes the line p600 set to 1 and the line p640 set to 1 by the OR circuit 430. Since the latch 460 has been already set to 1, the line p570 remains set to 1. Hence, since the latch 480 is set to 1, the line p650 is set to 1. If the line p650 is set to 1 and the line p670 is set to 1 because it is masked, the acknowledge generator 500 does not generate the acknowledge transaction but merely resets the latches 460, 470 and 480 through the line p620. This means that even if the acknowledge generator 500 receives the acknowledge transaction from the cache coherence controller 80, the acknowledge generator 500 does not give back the acknowledge transaction to the CPU 10 but merely reset the states of the latches 460, 470 and 480.

(4) The case that the latch 460 is set to 1 and the latch 470 is set to 1 in the masked synchronization controller 300 (no wait for completing the cache coherence control)

If masked, without setting the barrier transaction to the status register 360, the OR circuit 390 outputs 1. However, since the latch 470 is set to 1, the AND circuits 400 and 420 do not output 1. Hence, the barrier generator 340 is not started and neither the status register 360 and the request register 120 are reset. The foregoing operation may be described as follows. When all unmasked CPUs execute the barrier instruction and thereby the barrier operation is started, if no wait for completing the cache coherence control is specified (all the CPUs have specified the literal of the barrier instruction as 1), the masked synchronization controller 300 does not perform any operation.

Since no acknowledge transaction is received from the cache coherence controller 80, the latch 490 is not set to 1. However, since the latches 460 and 470 are both set to 1, the output of the OR circuit 430 is 1. Hence, by setting the latch 480 to 1, the line p650 is set to 1. If the line p650 is set to 1 and the line p670 is set to 1 because it is masked, the acknowledge generator 500 does not generate the acknowledge transaction but merely reset the latches 460, 470 and 480 through the line p620. This means that if the acknowledge transaction is given by the cache coherence controller 80, the acknowledge generator 500 does not give back the acknowledge transaction to the CPU 10 but merely resets the states of the latches 460, 470 and 480.

In the case that some of the synchronization controllers are masked, in the presence of the wait for completing the cache coherence control, the operations of (1) and (3) are mingled in each synchronization controller. However, each operation is executed to output the barrier transaction to the main memory controller 50 and the cache coherence controller 80. Conversely, in the absence of the wait for completing the cache coherence control, the operations of (2) and (4) are mingled in each synchronization controller. However, each operation is not executed to output the barrier transaction to the main memory controller 50 and the cache coherence controller 80.

3.3 Main Memory Controller

Figure 9:
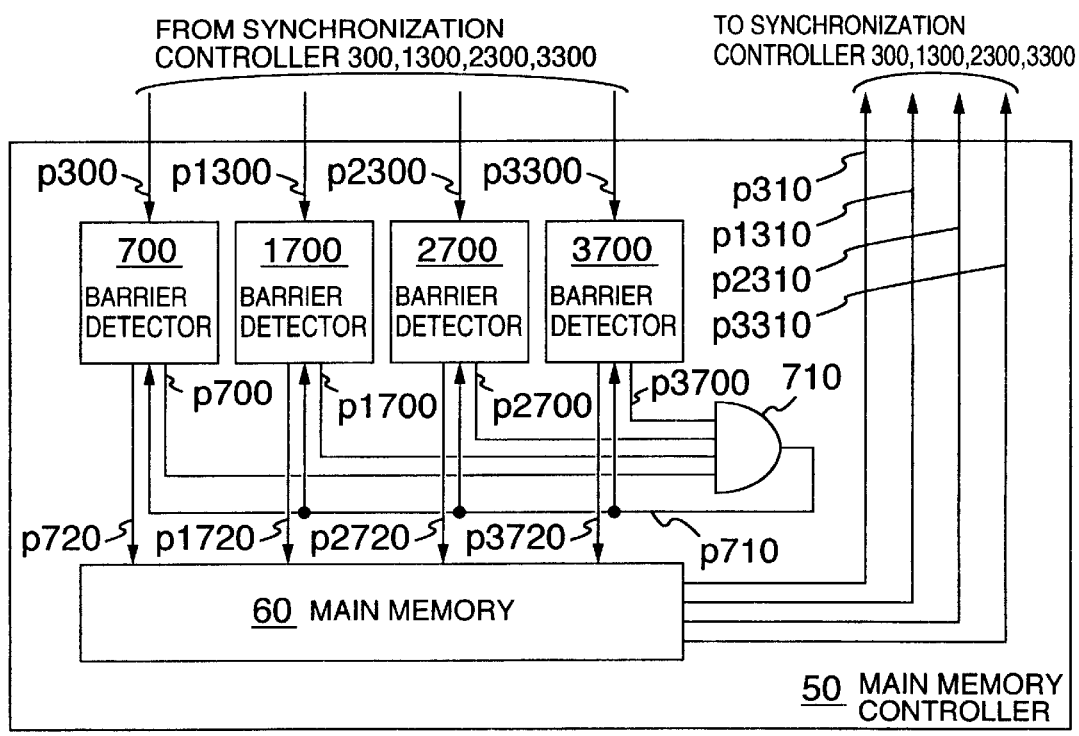
FIG. 9 is a view showing a main memory controller included in the arrangement of the embodiment.

This section describes the arrangement and the operation of the main memory controller 50 with reference to FIG. 9. The main memory controller 50 includes the barrier detectors 700, 1700, 2700 and 3700, and the main memory 60 inside of itself. If no barrier transaction is detected, the load/dload/store transactions coming from the synchronization controllers 300, 1300, 2300 and 3300 through the lines p300, p1300, p2300 and p3300 pass through the barrier detectors 700, 1700, 2700 and 3700. Then, those transactions are conveyed to the main memory 60 through the lines p720, 1720, 2720 and 3720 so that the main memory 60 may be accessed. The store transaction is executed to reflect the store data onto the main memory 60. The load/dload transactions are executed to give back the reply value to the synchronization controllers 300, 1300, 2300 and 3300 through the lines p310, p1310, p2310 and p3310.

When the barrier detector 700 detects the barrier transaction, the barrier detector 700 stops the access to the main memory 60 from the line p300 and then outputs 1 to the AND circuit 710 through the line p700. Likewise, when all the barrier detectors 1700, 2700 and 3700 detect the barrier transaction, the output line p710 of the AND circuit 710 is set to 1, thereby allowing each of the barrier detectors 700, 1700, 2700 and 3700 to be reset. Hence, after all the transactions before the barrier transaction are output to the main memory 60, the transactions after the barrier transaction are output to the main memory 60. This output operation implements the serialization of the accesses to the main memory by the barrier transaction.

3.4 Cache Coherence Controller

Figure 10:
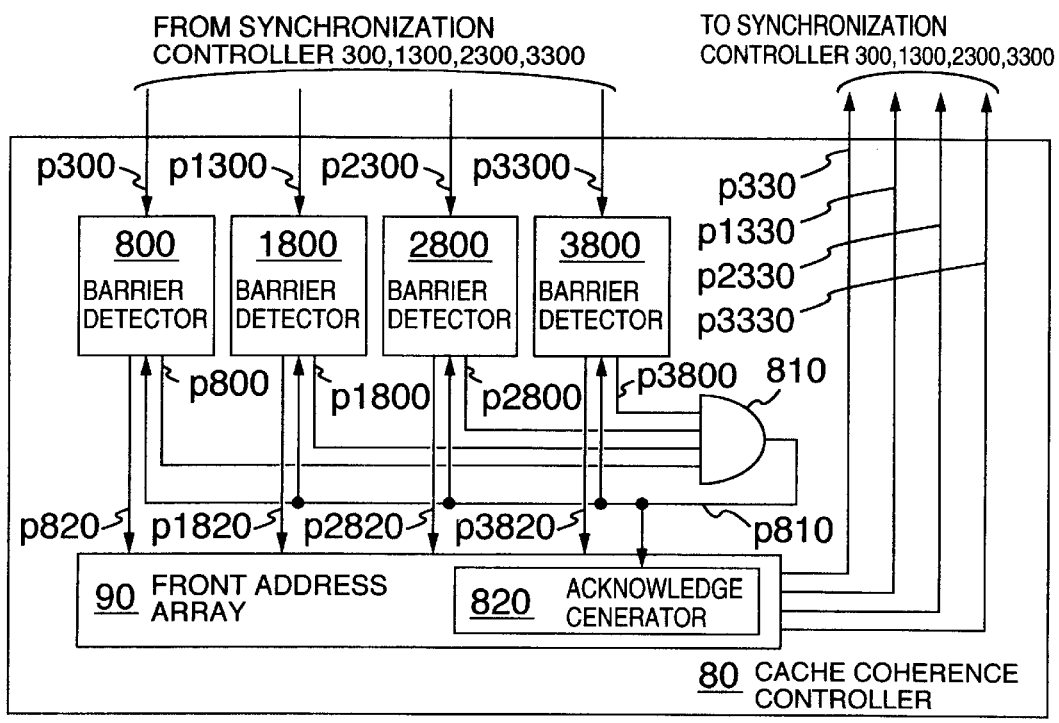
FIG. 10 is a view showing a cache coherence controller included in the arrangement of the embodiment.

This section describes the arrangement and the operation of the cache coherence controller 80 with reference to FIG. 10.

The cache coherence controller 80 includes the barrier detectors 800, 1800, 2800 and 3800, and an FAA (Front Address Array) 90 inside of itself. If no barrier transaction is detected, the load/store transactions coming from the synchronization controllers 300, 1300, 2300 and 3300 through the lines p300, p1300, p2300 and p3300 pass through the barrier detectors 800, 1800, 2800 and 3800 and then reach the FAA 90 through the lines p820, p1820, p2820 and p3820. The load transaction is registered in the FAA, while if the store transaction comes thereto, the FAA is checked and if the store is found, the FAA operates to generate the kill transaction and output it to the synchronization controllers 300, 1300, 2300 and 3300 through the lines p330, p1330, p2330 and p3330.

When the barrier detector 800 detects the barrier transaction, the line p800 is set to 1. At this time, the flow of the transaction from the line p300 to the FAA may be stopped or not. Both are OK. In order to deviate the CPUs 10, 1010, 2010 and 3010 from the barrier instruction, it is necessary for the cache coherence controller 80 to output the acknowledge. Hence, another transaction does not come after the barrier transaction. If the store transaction after the barrier instruction comes thereto, the kill transaction may be incorrectly generated. The accesses to the main memory are serialized. Hence, the load instruction before the barrier instruction makes access to the main memory in advance of the store instruction after the barrier instruction. No problem therefore takes place. On the other hand, it is not guaranteed that the main memory controller 50 makes the CPUs 10, 1010, 2010 and 3010 necessarily put in the waiting state until all the barrier transactions come in the CPUs. It means that the main memory controller 50 needs to serialize the accesses. Likewise, if all the barrier detectors 1800, 2800 and 3800 detect the barrier transaction, the output line p810 of the AND circuit 810 is set to 1, thereby allowing each of the barrier detectors 800, 1800, 2800 and 3800 to be reset and the acknowledge generator 820 to be started. Then, the acknowledge generator 820 operates to output the acknowledge transaction to the synchronization controllers 300, 1300, 2300 and 3300 through the lines p330, p1330, p2330 and p3330, respectively.

The manipulation of the FAA 90 about all the transactions before the barrier transaction is terminated. The relevant kill transaction is output to the synchronization controllers 300, 1300, 2300 and 3300 and then the acknowledge transaction is output.

3.5 Instruction Sequence

Figure 14:
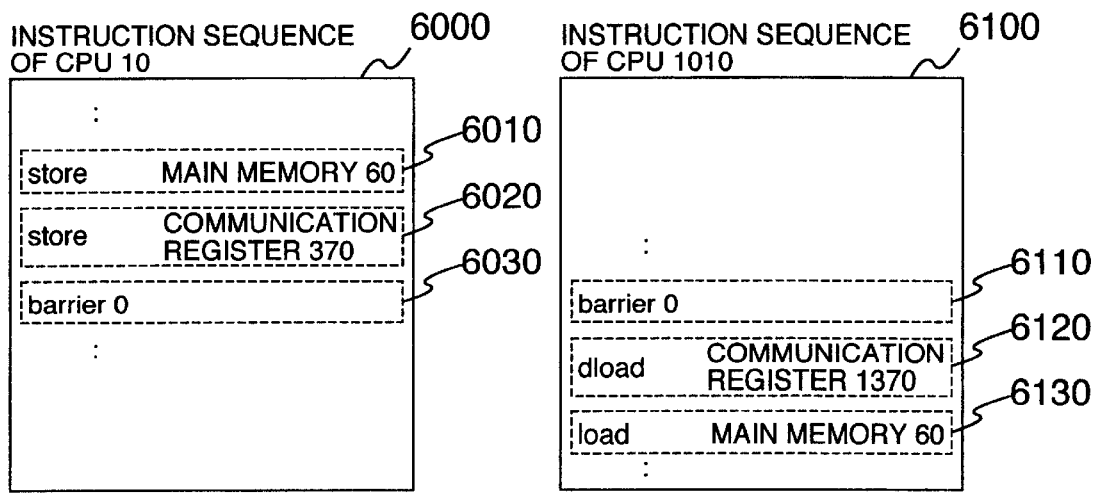
FIGS. 14, 15 and 16 are views showing examples of instruction sequence from two CPUs when barrier synchronization is executed in the foregoing embodiment.
Figure 15:
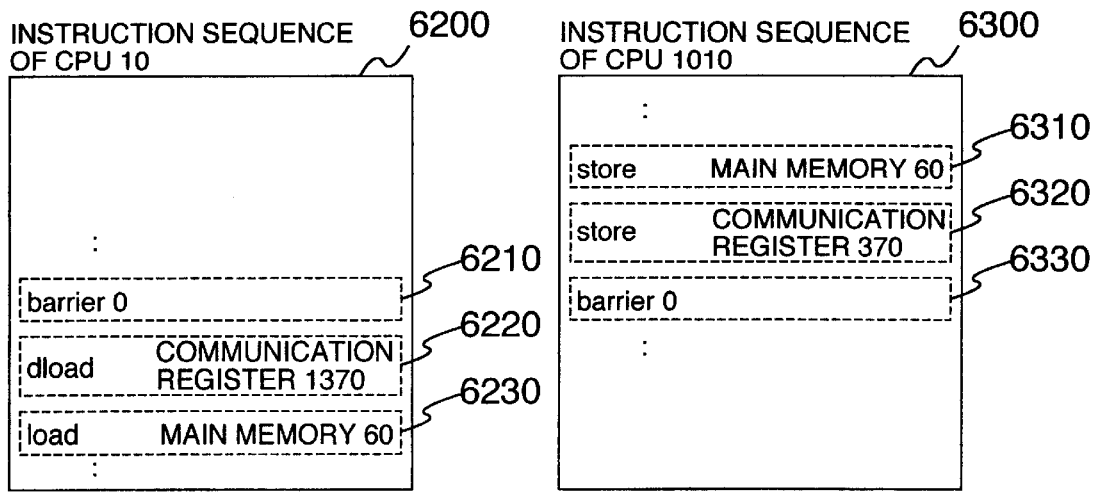
Figure 16:
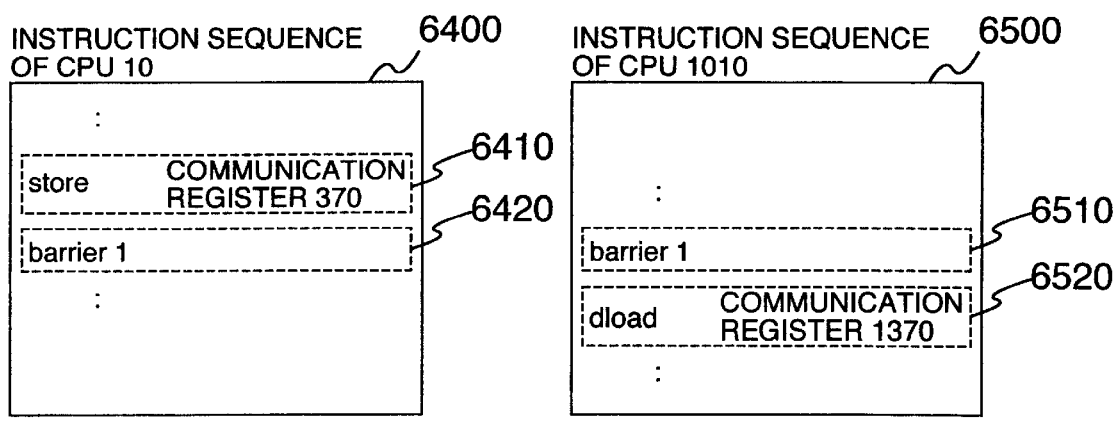

FIGS. 14 to 16 show the instruction sequence including the barrier instruction of this embodiment.

FIG. 14 shows the instruction sequence between the CPU 10 and the CPU 1010 about the pattern of the synchronization A in FIG. 11. It is to be guaranteed that the values of the store instructions (6010, 6020) to the main memory 60 and the communication register 370 executed by the CPU 10 before the barrier instruction (literal 0) is necessarily reflected on the dload instruction (6120) to the communication register 370 and the load instruction (6130) to the main memory 60 to be executed by the CPU 1010 after the barrier instruction (literal 0). Herein, the store instruction 6020 and the dload instruction 6120 are executed to make access to the communication register 370. However, this brings about no problem about the access to the main memory 60. In addition, the literal of the barrier instruction is specified as zero in both the CPUs 10 and 1010. In actual, any one of them may be 1.

FIG. 15 shows the instruction sequence between the CPU 10 and the CPU 1010 about the pattern of the synchronization B shown in FIG. 11. It is guaranteed that the values of the store instructions (6310, 6320) to the main memory 60 and the communication register 370 executed by the CPU 101Q before the barrier instruction (literal 0) are necessarily reflected on the dload instruction (6220) to the communication register 370 and the load instruction (6230) to the main memory 60 to be executed by the CPU 10 after the barrier instruction (literal 0). In addition, though the dload instruction is executed to make access to the communication register 370, this brings about no problem about the access to the main memory 60. In addition, the literal of the barrier instruction is specified as zero in both the CPUs 10 and 1010. Any one of them may be 1.

FIG. 16 shows the example of no wait for completing the cache coherence control. The literal of the barrier instruction is 1 in both the CPUs 10 and 1010. Hence, the barrier synchronization is functioned in the absence of the wait for completing the cache coherence control. In this case, the store instruction (6410) to the communication register 370 executed by the CPU 10 before the barrier instruction is necessarily reflected on the dload instruction (6520) to be executed by the CPU 1010 after the barrier instruction. However, the reflection of the result of the store instruction is not guaranteed by specifying the main memory 60 in place of the communication register 370. This holds true to the load instruction.

The switch connection type and shared main memory type multiprocessor is capable of concurrently and rapidly executing the memory access sequence guarantee and the cache coherence guarantee and improving the data exchange performance between the processors.

What we claim is:

1. A multiprocessor system comprising:
   a plurality of processors each of which has a cache memory;
   a main memory shared by said plurality of processors;
   a cache coherence controller for managing address information of data held in said cache memory of each of said processors and performing cache coherence control among said processors;
   each of said processors generating a synchronization transaction when executing an instruction for taking synchronization between processors;
   a main memory access sequence guaranteeing mechanism for stopping, when said synchronization transaction is received from one of said processors, main memory accesses resulting from said one of said processors and restarting said main memory accesses when all of said processors output the synchronization transaction; and
   a coherence completion guaranteeing mechanism for notifying each of said processors of completion of the coherence control when all of cache coherence control requests resulting from instructions executed by said plurality of processors before the instruction for taking said synchronization are output from said cache coherence controller to a corresponding one of said plurality of processors;

wherein, each of said plurality of processors stops execution of succeeding instructions during a term after executing the instruction for taking synchronization and until said notice from said coherence completion guaranteeing mechanism is received.

2. A multiprocessor system as claimed in claim 1 further comprising a synchronization transaction holding mechanism for holding said synchronization transaction received from one of said plurality of processors and outputting said synchronization transaction to said main memory and said cache coherence controller when all of said plurality of processors execute the instruction for taking said synchronization.

3. A multiprocessor system as claimed in claim 1, wherein said coherence completion guaranteeing mechanism stores the synchronization transaction received from one of said plurality of processors, releases the synchronization transaction if synchronizing transactions are received from said plurality of processors, and detects completion of the cache coherence control before synchronization by terminating the coherence control for transactions previous to the lastly received synchronization transaction.

4. A multiprocessor system comprising:
a plurality of processors each of which has a cache memory;
a main memory shared by said plurality of processors;
a cache coherence controller for managing address information of data held in the cache of each of said processors and performing cache coherence control among said processors;
each of said processors containing mask information for representing if it takes part in a synchronization among said processors;
each of said processors generating a synchronization transaction when an instruction for taking said synchronization among the processors taking part in the synchronization is executed;
a main memory access sequence guaranteeing mechanism for stopping, when said synchronization transaction is received from one of said processors, main memory accesses resulting from said one of said processors and restarting said main memory accesses when all of processors taking part in the synchronization output the synchronization transaction; and
a coherence completion guaranteeing mechanism for notifying each of the processors of the coherence completion control when all of cache coherence control requests resulting from instructions executed by the processors taking part in said synchronization before the instruction for taking said synchronization are output from said cache coherence controller to a corresponding one of said processors taking part in said synchronization;
wherein, each of the processors taking part in the synchronization stops execution of succeeding instructions during term after executing the instruction of taking synchronization and until said notice from said coherence completion guaranteeing mechanism is received.

5. A multiprocessor system as claimed in claim 4 further comprising a synchronization transaction holding mechanism for holding said synchronization transaction received from one of the processors taking part in said synchronization and outputting said synchronization transaction to said main memory and said coherence controller when all of the processors taking part in said synchronization execute the instruction for taking said synchronization.

6. A multiprocessor system as claimed in claim 4, wherein said cache coherence completion guaranteeing mechanism stores the synchronization transaction received from one of the processors taking part in said synchronization, releases said synchronization transaction when synchronization transactions are received from all of the processors taking part in said synchronization, and detects the end of the coherence control for the transactions previous to said lastly received synchronization transaction as the completion of the cache coherence control before synchronization.

7. A multiprocessor system comprising:
a plurality of processors each of which has a cache memory;
a main memory shared by said plurality of processors;
a cache coherence controller for managing address information of data held in the cache of each of said processors and performing cache coherence control among said processors;
said plurality of processors generating a synchronization transaction when the instruction for taking synchronization among said processors is executed; and
a coherence completion guaranteeing mechanism for notifying the processors of the completion of the cache coherence control when all of cache coherence control requests resulting from all instructions executed by said processors before the instruction for taking said synchronization is output from said cache coherence controller to each of said plurality of processors;
wherein, each of said plurality of processors stops execution of the succeeding instructions during a term after executing the instruction for taking synchronization and until said notice is received from said coherence completion guaranteeing mechanism and releases the stop of the execution when waiting time taken in stopping the execution of said succeeding instructions reaches a specified time.

8. A multiprocessor system comprising:
a plurality of processors each of which has a cache memory;
a main memory shared by said plurality of processors;
a cache coherence controller for managing address information of data held in said cache by each of said processors and performing cache coherence control among said processors;
each of said processors having mask information for representing if each processor takes part in the synchronization among said processors;
each of said processors generating synchronization transaction when an instruction for taking synchronization among the processors taking part in the synchronization is executed; and
a coherence completion guaranteeing mechanism for notifying each of said processors taking part in said synchronization of the completion of the cache coherence control when all of cache coherence control requests resulting from instructions executed by said processors taking part in said synchronization before said instruction for taking part in said synchronization are output from said cache coherence controller to a corresponding one of said processors taking part in said synchronization;

wherein, each of said processors taking part in said synchronization stops execution of succeeding instructions during a term after executing said instruction for taking synchronization and until said notice from said coherence completion guaranteeing mechanism is received and releases the stop of execution if waiting time for stopping the execution of said succeeding instructions exceeds the regulated time.

9. A multiprocessor system comprising:

a plurality of processors each of which has a cache memory;

a main memory shared by said processors;

a cache coherence controller for managing address information of data held in the cache of each of said processors and performing cache coherence control among said processors;

each of said processors generating a synchronization transaction when an instruction for taking synchronization among said processors is executed;

a plurality of communication registers for performing communications among said processors, said communication registers being provided corresponding to said processors respectively;

a main memory access sequence guaranteeing mechanism for stopping, when said synchronization transaction is received from one of said processors, main memory accesses resulting from said one of said processors and restarting said main memory accesses when all of said processors output the synchronization transactions; and a coherence completion guaranteeing mechanism for notifying each of said processors of completion of coherence control when all of cache coherence requests resulting from instructions executed by said processors before said synchronize instruction are output from said cache coherence controller to a corresponding one of said processors and all of accesses to said communication register by said processors before said synchronization transactions are completed;

wherein, each of said processors stops execution of succeeding instructions during a term after executing the instruction for taking synchronization and until said notice from said coherence completion guaranteeing mechanism is received.

10. A multiprocessor system as claimed in claim 9, wherein said instruction for taking synchronization is executed to select if the guaranteeing range by synchronization is only a value of said communication register or covers the guarantee of the access sequence to said main memory and the guarantee of the completion of the cache coherence control.

11. A multiprocessor system comprising:

a plurality of processors each of which has a cache memory;

a main memory shared by said processors;

a cache coherence controller for managing address information of data held in the cache of each of said processors;

each of said processors having mask information for representing if said processor takes part in the synchronization among said processors;

each of said processors generating synchronization transactions when an instruction for taking synchronization among the processors taking part in said synchronization is executed;

a plurality of communication registers for performing communications among said processors, said communication registers being provided corresponding to said processors respectively;

a main memory access sequence guaranteeing mechanism for stopping, when said synchronization transaction is received from one of said processors, said main memory accesses resulting from said one of said processors and restarting said main memory accesses when all of the processors taking part in the synchronization output the synchronization transaction; and a coherence completion guaranteeing mechanism for notifying said processors of completion of coherence control when all of cache coherence control requests resulting from instructions executed by said processors before said synchronize instruction from said cache coherence controller to a corresponding one of said processors taking part in said synchronization and all of accesses to said communication register by the processors taking part in said synchronization before the synchronization transaction are completed;

wherein, each of said processors taking part in said synchronization stops execution of succeeding instructions during a term after executing said instruction for taking synchronization and until said notice is received from said coherence completion guaranteeing mechanism.

12. A multiprocessor system as claimed in claim 11, wherein said instruction for taking synchronization is executed to select if the guaranteeing range by synchronization is only a value of said communication register or covers the guarantee of the access sequence to said main memory and the guarantee of the completion of the cache coherence control.

* * * * *